United States Patent
Higashitani

(10) Patent No.: US 8,780,419 B2
(45) Date of Patent: Jul. 15, 2014

(54) LIGHT GUIDE FOR GUIDING LIGHT OF LIGHT SOURCE, IMAGE READING APPARATUS AND IMAGE FORMING APPARATUS PROVIDED WITH THIS LIGHT GUIDE

(71) Applicant: KYOCERA Document Solutions Inc., Osaka (JP)

(72) Inventor: Masahiro Higashitani, Osaka (JP)

(73) Assignee: Kyocera Document Solutions Inc. (JP)

(*) Notice: Subject to any disclaimer, the term of this patent is extended or adjusted under 35 U.S.C. 154(b) by 0 days.

(21) Appl. No.: 13/749,196

(22) Filed: Jan. 24, 2013

(65) Prior Publication Data

US 2013/0194640 A1 Aug. 1, 2013

(30) Foreign Application Priority Data

Jan. 26, 2012 (JP) ................. 2012-014331

(51) Int. Cl.
*H04N 1/04* (2006.01)

(52) U.S. Cl.
USPC ............ 358/484; 358/474; 358/496; 358/497

(58) Field of Classification Search
USPC .......................... 358/484, 474, 496, 497, 498
See application file for complete search history.

(56) References Cited

U.S. PATENT DOCUMENTS

| | | | |
|---|---|---|---|
| 5,499,112 A | 3/1996 | Kawai et al. | |
| 5,905,583 A | 5/1999 | Kawai et al. | |
| 6,966,685 B2 * | 11/2005 | Li et al. | 362/616 |
| 7,639,918 B2 * | 12/2009 | Sayers et al. | 385/146 |
| 2001/0019480 A1 | 9/2001 | Fujino et al. | |
| 2002/0036729 A1 | 3/2002 | Ohkawa | |
| 2003/0076551 A1 | 4/2003 | Kawai et al. | |
| 2005/0265684 A1 | 12/2005 | Nemoto et al. | |
| 2006/0119899 A1 | 6/2006 | Kawai et al. | |
| 2009/0015886 A1 | 1/2009 | Kim et al. | |
| 2009/0086509 A1 | 4/2009 | Omori et al. | |
| 2009/0284810 A1 | 11/2009 | Kawai et al. | |
| 2010/0214803 A1 | 8/2010 | Sakamoto et al. | |
| 2011/0085212 A1 | 4/2011 | Sanada et al. | |

FOREIGN PATENT DOCUMENTS

| | | |
|---|---|---|
| JP | 6-217084 | 8/1994 |
| JP | 2001-5122 | 1/2001 |
| JP | 2001332112 | 11/2001 |
| JP | 2002-44378 | 2/2002 |
| JP | 2002197914 | 7/2002 |
| JP | 2005-300852 | 10/2005 |
| JP | 2011-81997 | 4/2011 |
| WO | 2008093929 | 8/2008 |

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

A light guide includes a main body, an input surface, an output surface, a reflecting surface, a first diffusing portion and a second diffusing portion. The main body is guiding light. The light is inputted the input surface of the main body. The light is emitted from the output surface in a direction intersecting with the longitudinal direction. The reflecting surface is provided on the main body and opposite to the output surface. The first diffusing portion is formed on the reflecting surface closer to the input surface. The second diffusing portion is formed on the reflecting surface closer to a side opposite to the input surface. The first and the second diffusing portions have a first and a second length respectively in a direction orthogonal to the longitudinal direction, and the first length is longer than the second length.

16 Claims, 7 Drawing Sheets

LIGHT GUIDE FOR GUIDING LIGHT OF LIGHT SOURCE, IMAGE READING APPARATUS AND IMAGE FORMING APPARATUS PROVIDED WITH THIS LIGHT GUIDE

This application is based on Japanese Patent Application Serial No. 2012-014331 filed with the Japan Patent Office on Jan. 26, 2012, the contents of which are hereby incorporated by reference.

BACKGROUND

The present disclosure relates to a light guide for linearly irradiating light of a light source while guiding the light, an image reading apparatus for reading an image of a document to which light from a light guide is irradiated, and an image forming apparatus for forming an image on a sheet based on an image read by the image reading apparatus.

Conventionally, an illumination device for illuminating a document with light of an LED (Light Emitting Diode) using a rod-like light guide is known as an illumination device for a scanner device for reading an image of a document. This illumination device reflects light by a reflecting member formed on one side surface of the light guide. Further, the reflected light is taken out in a direction orthogonal to the light guide to linearly illuminate a document in a main scanning direction. In such an illumination device, light from the LED is emitted to the outside only by being reflected once near the LED. As a result, there is a problem that illuminance is high near the LED while being low at positions distant from the LED.

Thus, the LED is so arranged that the center position thereof is displaced from the center of the reflecting member on the side surface of the light guide. The illumination device is known which has improved illuminance unevenness in the main scanning direction by reducing the emission of the light from the LED to the outside by being reflected only once.

In the illumination device as described above, not only illuminance unevenness in the main scanning direction, but also a light distribution quality in a sub scanning direction differs due to a difference in the number of light reflections on the inner surface of the light guide. Specifically, near the LED where the number of light reflections on the inner surface of the light guide is small, light is irradiated in a range narrow in the sub scanning direction. On the other hand, at positions which are distant from the LED and where the number of light reflections on the inner surface of the light guide is large, light is irradiated while being diffused in a range wide in the sub scanning direction.

Light emitted from the light guide is irradiated to a document placed on a transparent document platen or the like. However, if the document is lifted from the document platen, a distance between the light guide and the document differs depending on the position in the main scanning direction. A degree of an illuminance change when the distance between the light guide and the document changes is affected by light distribution in the sub scanning direction by the light guide. Thus, if light distribution in the sub scanning direction differs depending on the position in the main scanning direction as described above, the document may be lifted. In this case, a change of the illuminance corresponding to the position in the main scanning direction increases, wherefore there has been an inconvenience that illuminance unevenness caused by the lift of a document increases.

SUMMARY

A light guide according to one aspect of the present disclosure includes a main body, an input surface, an output surface, a reflecting surface, a first diffusing portion and a second diffusing portion. The main body is a rod-like member capable of guiding light in a longitudinal direction. The input surface is provided on one end of the main body and the light is inputted thereon. The output surface is a surface which is provided on the main body, from which the light is emitted in a direction intersecting with the longitudinal direction and which is long in the longitudinal direction. The reflecting surface is a surface provided on the main body and opposite to the output surface. The first diffusing portion is formed on a part of the reflecting surface closer to the input surface than a preset reference position and diffuses light. The second diffusing portion is formed on a part of the reflecting surface closer to a side opposite to the input surface than the reference position and diffuses light. The first diffusing portion has a first length in a direction orthogonal to the longitudinal direction, the second diffusing portion has a second length in the direction orthogonal to the longitudinal direction, and the first length is longer than the second length.

Further, an image reading apparatus according to another aspect of the present disclosure includes the above light guide, a light source for irradiating light to the input surface, a reflecting member arranged to face the reflecting surface and configured to reflect light, and an image reading unit for reading an image of a document to which light from the output surface is irradiated.

An image forming apparatus according to still another aspect of the present disclosure includes the above image reading apparatus, and an image forming unit. The image forming unit forms an image on a sheet based on an image read by the image reading apparatus.

These and other objects, features and advantages of the present disclosure will become more apparent upon reading the following detailed description along with the accompanying drawings.

DETAILED DESCRIPTION

Figure 1:
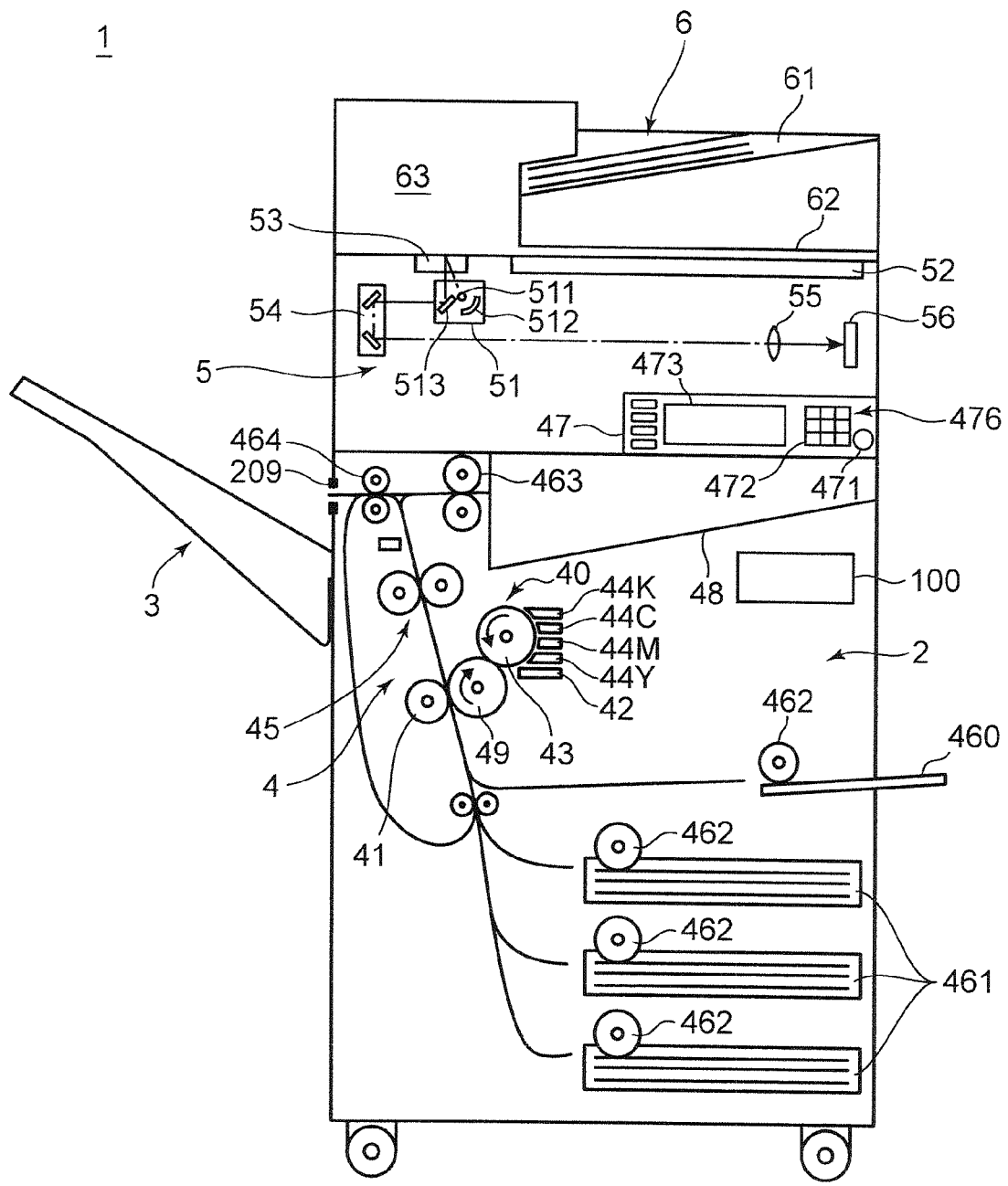
FIG. 1 is a side view schematically showing the internal configuration of a copier which is an example of an image forming apparatus according to one embodiment of the present disclosure.

Hereinafter, an embodiment according to the present disclosure is described based on the drawings. Note that components denoted by the same reference signs in the respective drawings have the same configurations and not repeatedly described. FIG. 1 is a side view schematically showing the internal configuration of a copier which is an example of an image forming apparatus according to one embodiment of the present disclosure. Note that the image forming apparatus is not limited to the copier and may be, for example, a facsimile machine, a complex machine or the like.

A copier 1 (image forming apparatus) includes a main body 2, a stack tray 3 arranged to the left of the main body 2, an image reading apparatus 5 arranged atop the main body 2 and according to one embodiment of the present disclosure, a document feeding unit 6 arranged atop the image reading apparatus 5, and a control unit 100 arranged in the main body 2 and configured by a microcomputer or the like. Further, a substantially rectangular operation panel unit 47 is provided on a front part of the copier 1.

A document platen 52 and a contact glass 53 made of a transparent material such as glass are arranged on the upper surface of the image reading apparatus 5. Below the document platen 52 and the contact glass 53, the image reading apparatus 5 includes a scanning unit 51 for irradiating illumination light to a document via the document platen 52 or the contact glass 53 and receiving the reflected light, a mirror unit 54 for reflecting a document image obtained by the scanning unit 51, an imaging lens 55 for condensing a document image from the mirror unit 54, and an image pickup device 56 (image reading unit) for generating image data by photoelectrically converting a document image imaged by the imaging lens 55.

Note that the image reading apparatus is not limited to an example incorporated into the image forming apparatus. The image reading apparatus may be a scanner device which is singly used.

The scanning unit 51 is driven in a sub scanning direction, for example, by an unillustrated stepping motor. The scanning unit 51 is displaced at a speed V and the mirror unit 54 is displaced at a speed V/2 in a lateral direction of FIG. 1, i.e. in the sub scanning direction, whereby an image of a document placed on the document platen 52 is imaged on the image pickup device 56 constantly with an equal optical path length.

Further, the scanning unit 51 is moved to a position facing the contact glass 53 when reading a document fed by the document feeding unit 6. Then, a document image is imaged on the image pickup device 56 by the scanning unit 51, the mirror unit 54 and the imaging lens 55. Then, the image pickup device 56 obtains the document image in synchronization with a document conveying operation by the document feeding unit 6 and outputs that image data to the control unit 100. For example, a CCD (Charge Coupled Device) image sensor is used as the image pickup device 56.

The scanning unit 51 includes a line light source 511, a reflecting plate 512 for reflecting light emitted from the line light source 511 toward the document platen 52 and the contact glass 53, and a mirror 513 for reflecting reflected light having transmitted through the document platen 52 or the contact glass 53 from a document to the mirror unit 54.

Further, the line light source 511, the reflecting plate 512, the mirror 513, the mirror unit 54, the imaging lens 55 and the image pickup device 56 extend longer than the widths of the document platen 52 and the contact glass 53 in the main scanning direction.

Note that a long CIS (Contact Image Sensor) extending in the main scanning direction may be used instead of using the mirror 513, the mirror unit 54, the imaging lens 55 and the image pickup device 56.

The document feeding unit 6 includes a document placing portion 61 on which documents are to be placed, a document discharging portion 62 to which documents having images thereof already read are to be discharged, and a document conveying mechanism 63 with a feed roller (not shown), conveyor rollers (not shown) and the like for picking up documents placed on the document placing portion 61 one by one, conveying them to a position facing the contact glass 53 and discharging them to the document discharging portion 62.

Further, the document feeding unit 6 is provided rotatably relative to the main body 2 so that the front side thereof is movable upward. By moving the front side of the document feeding unit 6 upward and exposing the upper surface of the document platen 52, a user can place a document to be read, e.g. a book or the like in an open state, on the upper surface of the document platen 52.

The main body 2 includes a manual feed tray 460, a plurality of sheet cassettes 461, a plurality of feed rollers 462, an image forming unit 4, a discharge tray 48, the control unit 100 and the like. The image forming unit 4 includes an image generating unit 40, a fixing unit 45 and various conveyor rollers and the like provided in a sheet conveyance path in the image forming unit 4. The image generating unit 40 includes an exposure device 42, a photoconductive drum 43, developing devices 44Y, 44M, 44C and 44K for respective colors of yellow, magenta, cyan and black, an intermediate transfer roller 49 and a transfer roller 41.

The photoconductive drum 43 is uniformly charged by a charger (not shown) while being rotated in an arrow direction. The exposure device 42 converts a modulation signal generated by the control unit 100 based on image data of a document read by the image reading apparatus 5 into laser light and outputs the laser light to form an electrostatic latent image of each different color on the photoconductive drum 43. The developing devices 44Y, 44M, 44C and 44K form toner images of the respective colors by supplying developers of the respective colors to the photoconductive drum 43. Toner images of the respective colors are transferred from the photoconductive drum 43 to the intermediate transfer roller 49, whereby a full color toner image is formed on the intermediate transfer roller 49.

On the other hand, the feed rollers 462 pick up sheets from the manual feed tray 460 and the sheet cassettes 461 storing sheets and feed them to the transfer roller 41. The transfer roller 41 transfers a toner image on the intermediate transfer roller 49 to a sheet conveyed thereto, and the fixing unit 45 fixes the transferred toner image to the sheet by heating the toner image. Thereafter, the sheet is discharged to the stack tray 3 through a discharge opening 209 of the main body 2. Further, sheets are also discharged to the discharge tray 48 according to need. Specifically, the image forming unit 4 forms an image on a sheet based on an image read by the image reading apparatus 5.

Figure 2:
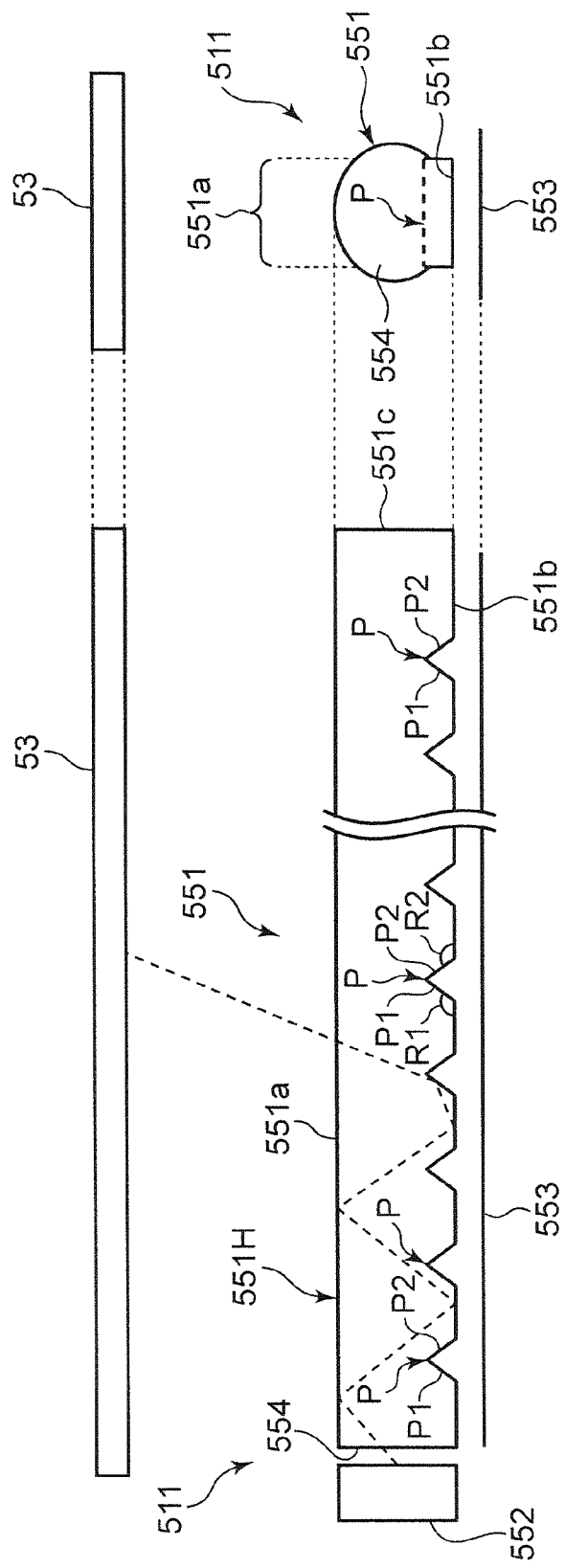
FIG. 2A is a sectional view showing the configuration of a line light source shown in FIG. 1.
FIG. 2B is a front view showing the configuration of the line light source shown in FIG. 1.

FIG. 2 are views showing the configuration of the line light source 511 shown in FIG. 1. FIG. 2 show a state where the line light source 511 is arranged below the contact glass 53. FIG. 2A is a sectional view showing a state where the line light source 511 is cut along a longitudinal direction (main scanning direction). The line light source 511 includes a light guide 551, a light source 552 and a plate-like reflecting member 553. FIG. 2B is a front view of the light guide 551 when viewed from a side of an input surface 554 on which light from the light source 552 is inputted.

The light guide 551 is a substantially cylindrical member made of, e.g. a transparent resin material. The light guide 551 is entirely formed by a rod-like main body 551H. The main body 551H has the input surface 554, an output surface 551a, a reflecting surface 551b and a rear end surface 551c. The input surface 554 is one end surface of the light guide 551. The light source 552 is arranged at a position facing the input surface 554. The light source 552 and the input surface 554 are arranged to face each other. For example, an LED is used as the light source 552. The light source 552 irradiates light to the input surface 554.

The output surface 551a is a side surface of the light guide 551. The output surface 551a is arranged to face the contact glass 53. The output surface 551a is in the form of a strip extending along a longitudinal direction of the light guide 551. Light is emitted from the light guide 551 to the outside through the output surface 551a. The reflecting surface 551b is a flat surface arranged to face the output surface 551a. The reflecting surface 551b reflects a part of light propagating in the light guide 551 toward the output surface 551a. The reflecting member 553 is arranged to face the reflecting surface 551b. The reflecting member 553 reflects the light having transmitted through the reflecting surface 551b to return it to the light guide 551.

On the reflecting surface 551b, a plurality of recesses P which extend in a direction (sub scanning direction) orthogonal to the longitudinal direction of the light guide 551 and function as prisms are arranged at predetermined intervals along the longitudinal direction of the light guide 551. The rear end surface 551c is an end surface of the light guide 551 opposite to the input surface 554. The rear end surface 551c is a reflecting end surface, on which aluminum is, for example, deposited. The rear end surface 551c reflects light propagating from the light guide 551 toward the outside to return it to the interior of the light guide 551.

Each recess P has a first prism surface P1 and a second prism surface P2. The recess P is formed, for example, by scraping off (cutting) the reflecting surface 551b into a wedge shape. A surface of each recess P closer to the input surface 554 serves as the first prism surface P1 and a surface thereof closer to the rear end surface 551c (surface on a side opposite to the input surface 554) serves as the second prism surface P2. FIG. 2A shows an example in which an angle R1 formed by the first prism surface P1 and the reflecting surface 551b on the input surface 554 side and an angle R2 formed by the second prism surface P2 and the reflecting surface 551b on a side opposite to the input surface 554 are substantially equal and both substantially 135° (e.g. 130° to 140°).

Light emitted from the light source 552 is introduced into the light guide 551 through the input surface 554. The light guide 551 repeatedly reflects the light introduced through the input surface 554 by the inner surface (interface with air) of the light guide 551. In this way, the light guide 551 guides the light in the longitudinal direction of the light guide 551, i.e. in the main scanning direction. At this time, a part of the light is reflected toward the output surface 551a by the recesses P and irradiates a document on the contact glass 53 through the output surface 551a. The image pickup device 56 described above reads an image of the document to which the light from the output surface 551a is irradiated.

Further, a part of the light transmits through the reflecting surface 551b to leak to the outside of the light guide 551. However, the light having transmitted through the reflecting surface 551b is reflected by the reflecting member 553 to be introduced into the interior of the light guide 551 again. In this way, loss of the light transmitting through the reflecting surface 551b is reduced by the reflecting member 553.

Figure 3:
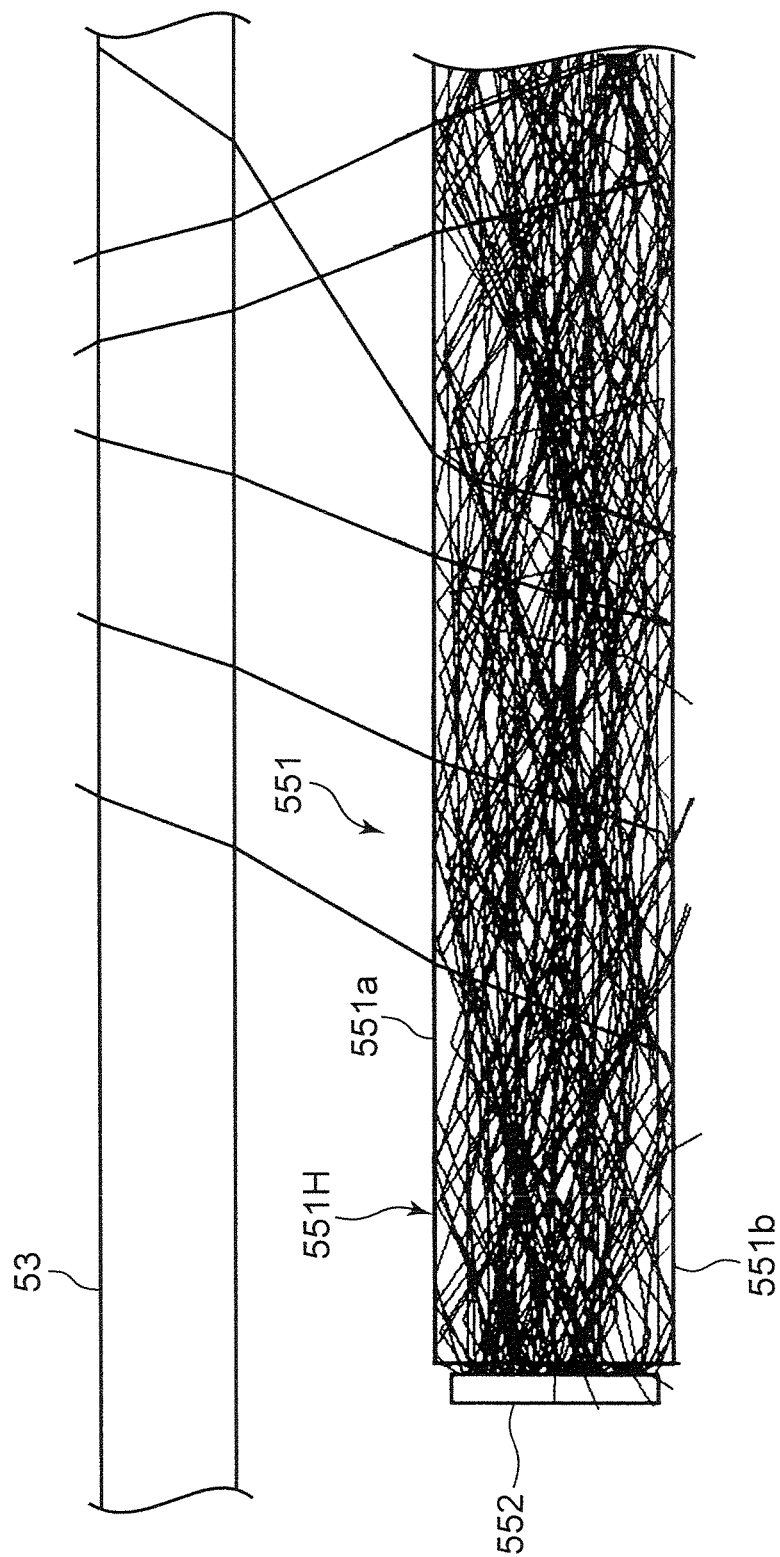
FIG. 3 is a view showing a result of simulating a state of a beam of light emitted from the light source near the light source.

FIG. 3 is a view showing a result of simulating a state of a beam of light emitted from the light source 552 near the light source 552. As shown in FIG. 3, the beam of light emitted from the light source 552 propagates in the light guide 551 while being repeatedly reflected by the inner surface of the light guide 551. During the propagation of the beam of light, the beam of light is reflected by the recesses P. The reflected beam of light is taken out to the outside through the output surface 551a and irradiates a desired position of a document surface on the contact glass 53.

Figure 4:
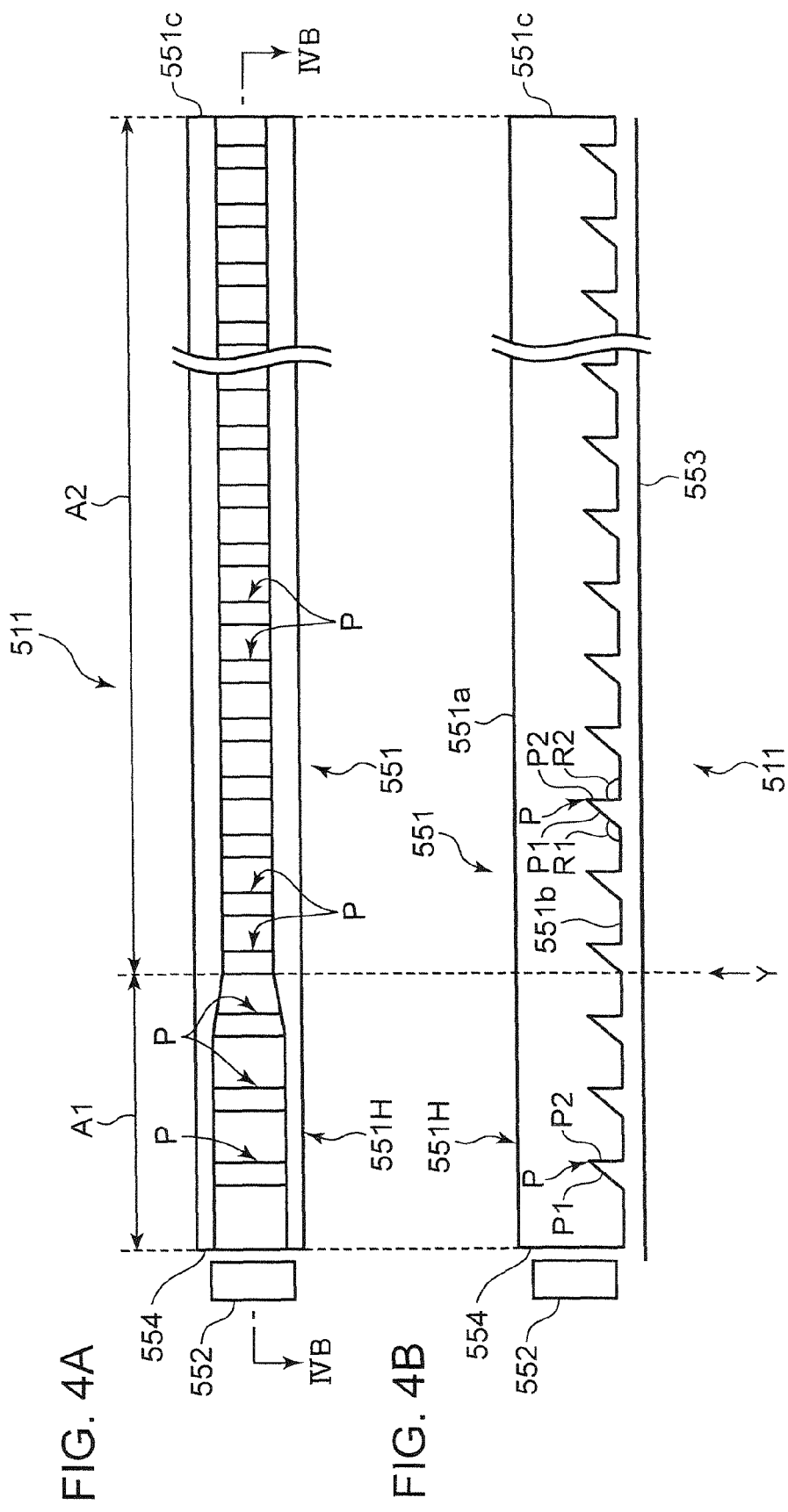
FIG. 4A is a bottom view of the line light source when viewed from a reflecting surface side.
FIG. 4B is a sectional view along IVB-IVB of the line light source shown in FIG. 4A.

FIG. 4A is a bottom view of the line light source 511 when viewed from the reflecting surface 551b side. FIG. 4A is also a bottom view of the line light source 511 shown in FIG. 2. FIG. 4B is a sectional view along IVB-IVB of the line light source 511 shown in FIG. 4A. Note that the recesses P are enlarged in FIG. 4B to facilitate description. Thus, the positions and number of the recesses P do not match in FIGS. 4A and 4B. Further, FIG. 4B shows an example in which the angle R1 is larger than the angle R2 and substantially 135° (e.g. 130° to 140°) and the angle R2 is substantially a right angle (e.g. 90° to 95°) unlike FIG. 2A. Substantially the right angle means substantially 90°. In the following description, substantially the right angle means, for example, an angle in a range of 90° to 95°, more preferably 90°.

Further, as shown in FIG. 4A, a part of the reflecting surface 551b closer to the input surface 554 than a reference position Y serves as a first diffusing portion A1 and a part thereof closer to the rear end surface 551c than the reference position Y serves as a second diffusing portion A2. The length in the sub scanning direction (first length) of the recesses P formed in the first diffusing portion A1 is longer than the length in the sub scanning direction (second length) of the recesses P formed in the second diffusing portion A2.

The closer to the input surface 554, the smaller the number of reflections of light emitted from the light source 552 before being emitted to the outside through the output surface 551a. The closer to the rear end surface 551c, the larger this number. Due to this difference in the number of reflections, cross-sectional light distribution in the sub scanning direction of the light emitted to the outside through the output surface 551a differs. Specifically, the light concentrates in a narrow range at positions near the input surface 554 and is diffused in a wide range at positions close to the rear end surface 551c.

Figure 5:
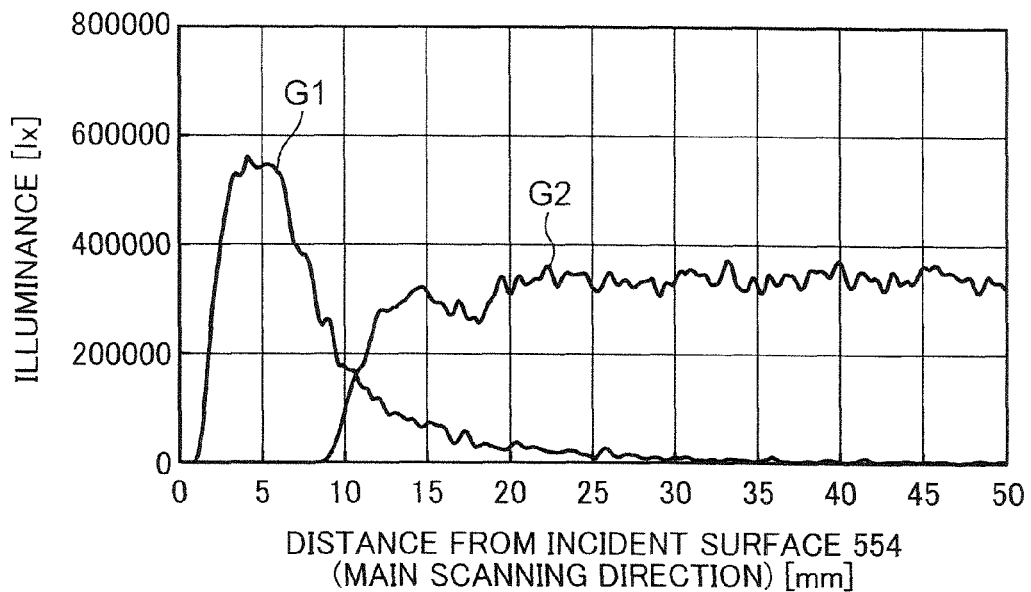
FIG. 5 is a graph showing a relationship between a distance from an input surface and light illuminance at positions where light from an output surface is emitted when the lengths of all recesses are set to be equal, the relationship being obtained by simulation for less reflected light which is reflected once or less in a light guide and for more reflected light which is reflected twice or more in the light guide.

FIG. 5 is a graph showing a relationship between a distance from the input surface 554 and illuminance of emitted light at positions where the light is emitted from the output surface 551a when the lengths of all the recesses in the sub scanning direction are set to be equal, the relationship being obtained by simulation for less reflected light which is reflected once or less in the light guide 551 and for more reflected light which is reflected twice or more in the light guide 551. A graph G1 is a graph of the less reflected light and a graph G2 is a graph of more reflected light.

As shown in FIG. 5, when the lengths of all the recesses P in the sub scanning direction are set to be equal, the less reflected light (graph G1) has higher illuminance than the more reflected light (graph G2) in a range where the distance from the input surface 554 is shorter than 11 mm and the more reflected light (graph G2) has higher illuminance than the less reflected light (graph G1) in a range where the distance from the input surface 554 is 11 mm or longer.

Figure 6:
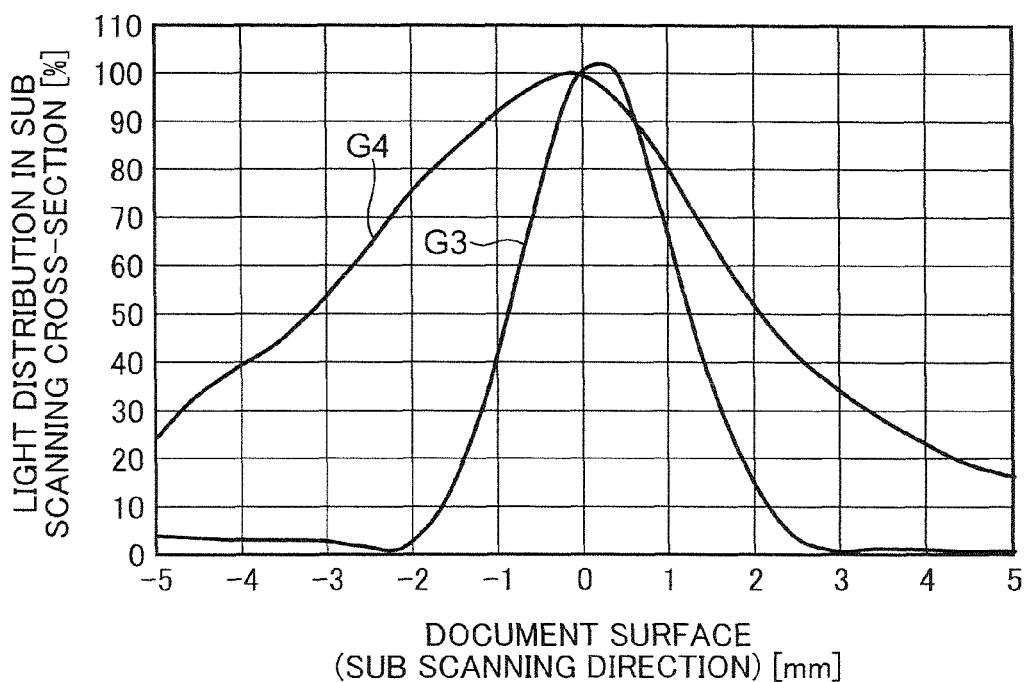
FIG. 6 is a graph showing a light distribution quality of light irradiated to a document on a contact glass by the line light source, in which the lengths of all the recesses of the light guide are set to be equal, the light distribution quality being obtained by simulation.

FIG. 6 is a graph showing a light distribution quality of light irradiated to a document on the contact glass 53 by the line light source 551, in which the lengths of all the recesses of the light guide 551 in the sub scanning direction are set to be equal, the light distribution quality being obtained by simulation. A horizontal axis represents a distance from 0 in the sub scanning direction when 0 is a center position of the light irradiated to the document surface in the sub scanning direction. A vertical axis represents light distribution in a sub scanning cross-section expressing illuminance at positions indicated on the horizontal axis in percentage when illuminance at a position where the light irradiated to the document surface is brightest is substantially 100%.

A graph G3 in FIG. 6 shows light distribution in a sub scanning cross-section near the input surface 554, e.g. at a position about 5 mm distant from the input surface 554 shown in FIG. 5, and a graph G4 shows light distribution in a sub scanning cross-section at a position distant from the input surface 554, e.g. at a position about 40 mm distant from the input surface 554 shown in FIG. 5.

When the lengths of all the recesses P of the light guide 551 in the sub scanning direction are set to be equal, the less reflected light is dominant at positions near the input surface 554 and the more reflected light is dominant at positions distant from the input surface 554 as shown in FIG. 5. As a result, as shown in FIG. 6, light concentrates in a narrow range in the sub scanning direction near the input surface 554 (graph G3) and light is diffused to be irradiated in a wide range in the sub scanning direction at positions distant from the input surface 554 (graph G4).

As just described, if the lengths of all the recesses P of the light guide 551 in the sub scanning direction are set to be equal, light distribution in the sub scanning direction largely differs depending on the position in the main scanning direction.

Accordingly, as shown in FIG. 4A, the length in the sub scanning direction of the recesses P in the first diffusing portion A1 near the input surface 554 is set to be longer than that of the recesses P in the second diffusing portion A2 distant from the input surface 554. The length in the sub scanning direction of the recesses P in the first diffusing portion A1 is specifically the length of the first diffusing portion A1 in the sub scanning direction, and that of the recesses P in the second diffusing portion A2 is specifically the length of the second diffusing portion A2 in the sub scanning direction.

Further, a position where the graphs G1 and G2 shown in FIG. 5 intersect, e.g. a position 11 mm distant from the input surface 554 in the example shown in FIG. 5 is used as the reference position Y. Specifically, when the lengths in the sub scanning direction of all the recesses P of the light guide 551 are set to be equal, an area strongly affected by less reflected light is the first diffusing portion A1 and an area strongly affected by more reflected light is the second diffusing portion A2.

In this way, the recesses P are long in the sub scanning direction in the first diffusing portion A1 near the input surface 554. Thus, light reflected by the first prism surfaces P1 of the recesses P spreads in the sub scanning direction, with the result that differences in light distribution in the sub scanning direction depending on the position in the main scanning direction are reduced. Further, a part of the light input on the first prism surfaces P1 of the recesses P transmits through the first prism surfaces P1 and is reflected by the reflecting member 553, with the result that the number of reflections of the light increases and the light is diffused. Thus, the light that transmits through the first prism surfaces P1 and is reflected by the reflecting member 553 increases in the first diffusing portion A1 where the recesses P are long in the sub scanning direction. As a result, light is diffused near the input surface 554 and differences in light distribution in the sub scanning direction depending on the position in the main scanning direction are reduced. Therefore, the light guide 551 can reduce differences in light distribution in the sub scanning direction depending on the position in the main scanning direction.

Accordingly, the image reading apparatus 5 including the light guide 551 can reduce distribution unevenness of the light irradiated to a document in the sub scanning direction. Further, since an image is formed on a sheet based on an image of a document read by irradiating light, the distribution unevenness of which in the sub scanning direction is reduced, in the copier 1 including the image reading apparatus 5, the quality of the image formed on the sheet is improved.

Note that the length in the sub scanning direction of the recesses P in the first diffusing portion A1 (first length) may be changed to gradually approach the length in the sub scanning direction of the recesses P in the second diffusing portion A2 (second length) toward the second diffusing portion A2 at least in a part of the first diffusing portion A1 including an area adjacent to the second diffusing portion A2.

If the length of the recesses P in the sub scanning direction discontinuously changes at a boundary between the first and second diffusing portions A1, A2, the illuminance of light emitted from the output surface 551a near the boundary between the first and second diffusing portions A1, A2 may become discontinuous. Accordingly, by making the length in the sub scanning direction of the recesses P in the first diffusing portion A1 gradually approach the length in the sub scanning direction of the recesses P in the second diffusing portion A2 toward the second diffusing portion A2 at least in the part of the first diffusing portion A1 including the area adjacent to the second diffusing portion A2, the length of the recesses P in the sub scanning direction does not discontinuously change, with the result that a likelihood of making illuminance discontinuous is reduced.

Note that the first and second diffusing portions A1, A2 are not limited to those which diffuse light by the recesses P. For example, instead of forming the recesses P, the first and second diffusing portions A1, A2 may be formed by forming rough surfaces on the reflecting surface 551b. Even if the first and second diffusing portions A1, A2 are configured to diffuse light by a means different from the recesses P, differences in light distribution in the sub scanning direction depending on the position in the main scanning direction can be reduced.

Figure 7A:
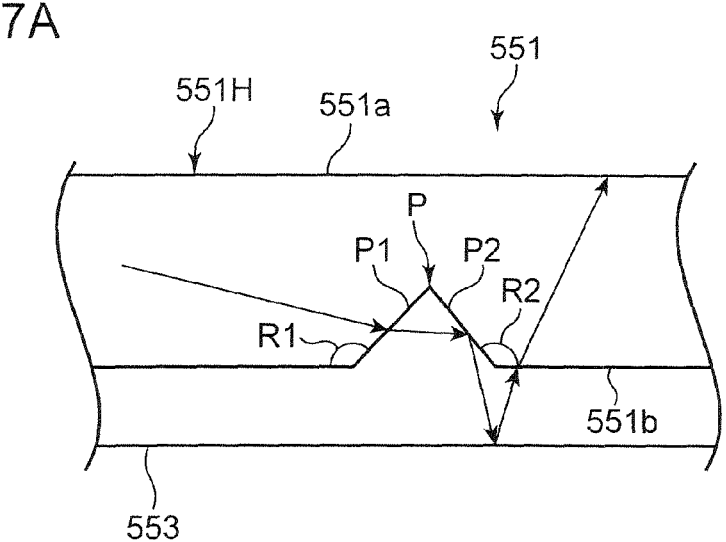
FIGS. 7A to 7C are diagrams showing a relationship of an angle of each surface of a recess and light reflection and transmission.
Figure 7B:
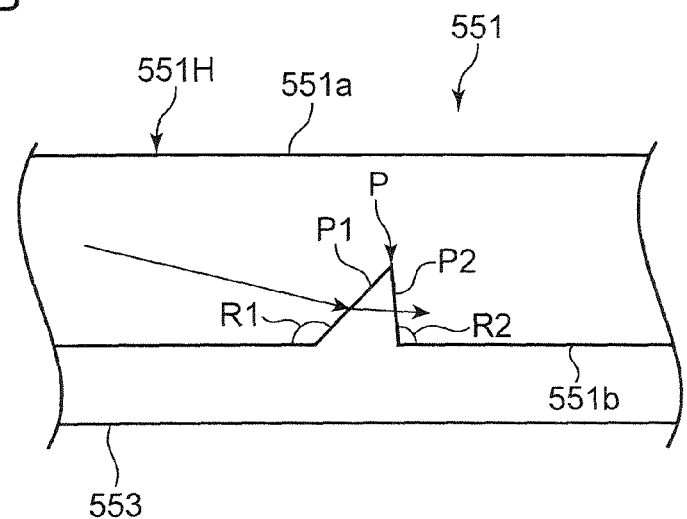
Figure 7C:
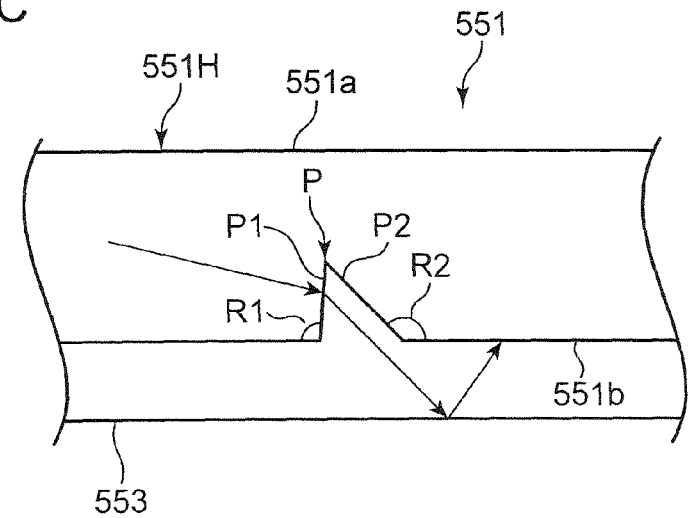

Further, loss of light guided by the light guide 551 is reduced by making the angle R1 larger than the angle R2 as shown in FIG. 4B. FIGS. 7A to 7C are diagrams showing a relationship of the angles R1, R2 of the recess P and light reflection and transmission.

FIG. 7A shows an example in which the angles R1, R2 of the recess P are substantially equal and both substantially 135° (e.g. 130° to 140°) as in the example shown in FIG. 2A. FIG. 7B shows an example in which the angle R1 of the recess P is larger than the angle R2 and substantially 135° (e.g. 130° to 140°) and the angle R2 is substantially a right angle as in the example shown in FIG. 4B. FIG. 7C shows an example in which the angle R1 of the recess P is smaller than the angle R2 and substantially a right angle and the angle R2 is 135° (e.g. 130° to 140°) contrary to the example shown in FIG. 7B.

Since an input angle of light having transmitted through the first prism surface P1 of the recess P shown in FIG. 7A on the second prism surface P2 is larger than in the example shown in FIG. 7B, the light is reflected by the second prism surface P2 and likely to leak to the outside of the light guide 551 from the reflecting surface 551b. The light having leaked to the outside of the light guide 551 is reflected by the reflecting member 553 and input on the light guide 551 again, but loss of light energy increases due to reflectivity of the reflecting member 553 and Fresnel loss at the time of re-incidence on the light guide 551. On the other hand, since an input angle of light having transmitted through the first prism surface P1 of the recess P shown in FIG. 7B on the second prism surface P2 is smaller than in the example shown in FIG. 7A, the light input on the second prism surface P2 is likely to transmit through the second prism surface P2 and return to the interior of the light guide 551. Thus, loss of light energy in the light guide 551 is reduced more by the recess P shown in FIGS. 7B and 4B than by the recess shown in FIGS. 7A and 2A.

Figure 8:
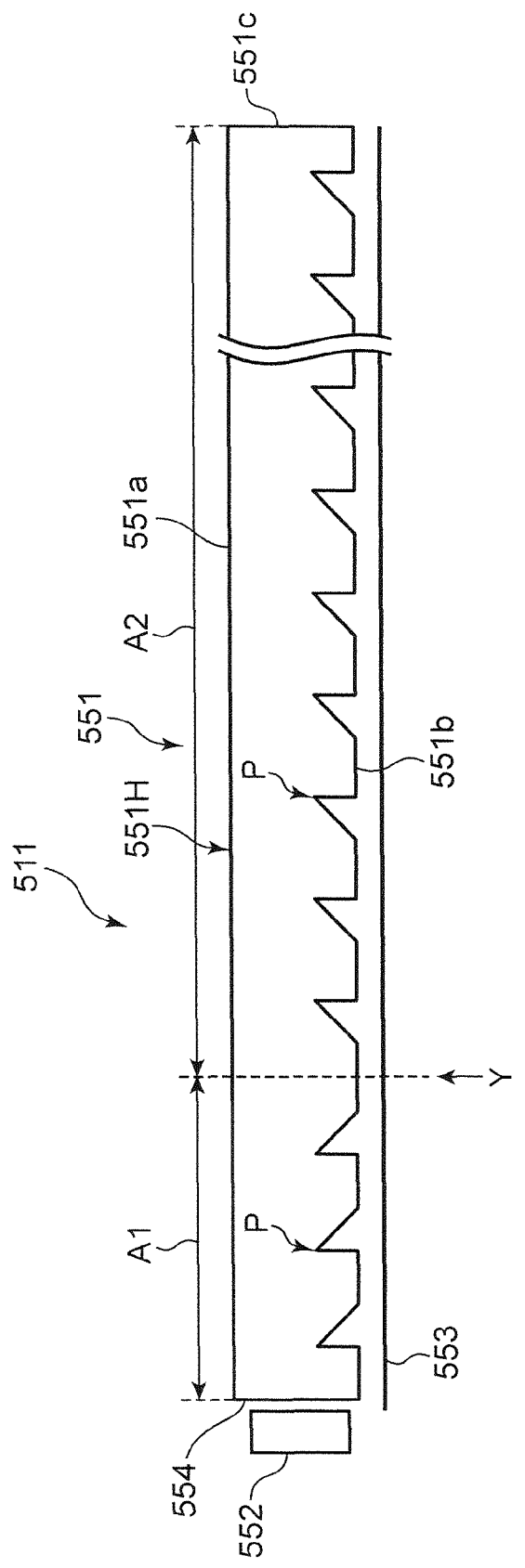
FIG. 8 is a sectional view showing another example of the light guide.

On the other hand, light is reflected more by the reflecting member 553 and, hence, an effect of diffusing the light in the sub scanning direction is larger with the recess P shown in FIG. 7A than with the recess P shown in FIG. 7B. Accordingly, the angle R2 of the recesses P included in the second diffusing portion A2 may be made smaller than that of the recesses P included in the first diffusing portion A1 by replacing the recesses P of the first diffusing portion A1 by the recesses P shown in FIG. 7A in the light guide 551 shown in FIG. 4B. Alternatively, the angle R2 of the recesses P included in the second diffusing portion A2 may be made smaller than the angle R2 of the recesses P included in the first diffusing portion A1 by forming the recesses P shown in FIG. 7C as the recesses P of the first diffusing portion A1 and forming the recesses P shown in FIG. 7B as the recesses P of the second diffusing portion A2 as shown in FIG. 8. The angle R2 formed by the second prism surfaces P2 of the recesses P included in the second diffusing portion A2 and the longitudinal direction of the light guide 551 on the side opposite to the input surface 554 is preferably made smaller than the angle R2 formed by the second prism surfaces P2 of the recesses P included in the first diffusing portion A1 and the longitudinal direction of the light guide 551 on the side opposite to the input surface 554 in this way.

By this, differences in light distribution in the sub scanning direction depending on the position in the main scanning direction can be reduced by increasing a light diffusion amount near the input surface 554 while reducing loss of light energy in the second diffusing portion A2. Particularly, if the angle R2 of the recesses P included in the second diffusing portion A2 is set to be substantially a right angle, light leaking to the outside of the light guide 551 from the second diffusing portion A2 can be effectively reduced, with the result that an effect of reducing loss of light energy is increased.

Further, the angle R1 of the recesses P included in the first diffusing portion A1 may be made smaller than the angle R1 of the recesses P included in the second diffusing portion A2 by forming the recesses P shown in FIG. 7C as the recesses P of the first diffusing portion A1 and forming the recesses P shown in FIG. 7B as the recesses P of the second diffusing portion A2 as shown in FIG. 8. The angle R1 formed by the first prism surfaces P1 of the recesses P included in the first diffusing portion A1 and the longitudinal direction of the light guide 551 on the input surface 554 side is preferably made smaller than the angle R1 formed by the first prism surfaces P1 of the recesses P included in the second diffusing portion A2 and the longitudinal direction of the light guide 551 on the input surface 554 side in this way.

The angle R1 of the first prism surface P1 of the recess P shown in FIG. 7C is substantially a right angle and an input angle of input light from the light source 552 on the first prism surface P1 is smaller. Thus, in the recess P shown in FIG. 7C, light propagating toward the reflecting member 553 through the first prism surface P1 increases more than in the recesses P shown in FIGS. 7A and 7B, with the result that the light reflected by the reflecting member 553 increases and an effect of diffusing the light in the sub scanning direction is increased.

Thus, it is possible to increase the light diffusion amount near the input surface 554 and increase an effect of reducing differences in light distribution in the sub scanning direction depending on the position in the main scanning direction by making the angle R1 of the recesses P included in the first diffusing portion A1 smaller than the angle R1 of the recesses P included in the second diffusing portion A2 as shown in FIG. 8. Particularly, if the angle R1 of the recesses P included in the first diffusing portion A1 is substantially a right angle, the light diffusion amount can be effectively increased.

Note that, in FIG. 8, the recesses P of the second diffusing portion A2 may be recesses P shown in FIG. 7A.

Further, the height, the arrangement interval and the like of the recesses P are appropriately set to make illuminance uniform in the sub scanning direction. For example, the arrangement interval of the recesses P may be made wider near the input surface 554 and may be made narrower with distance from the input surface 554. Alternatively, the height (cut depth) of the recesses P may be made lower (shallower) near the input surface 554 and may be made higher (deeper) with distance from the input surface 554. In this way, illuminance can be made uniform in the main scanning direction.

As described above, the light guide 551, the image reading apparatus 5 and the copier 1 configured as described above can reduce light distribution unevenness in the sub scanning direction.

An object of the present disclosure is to provide a light guide capable of reducing light distribution unevenness in a sub scanning direction, an image reading apparatus and an image forming apparatus.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A light guide, comprising:
    a rod-like main body which is capable of guiding light in a longitudinal direction;
    an input surface which is provided on one end of the main body and on which the light is inputted;
    an output surface which is provided on the main body, from which the light is emitted in a direction intersecting with the longitudinal direction and which is long in the longitudinal direction;
    a reflecting surface which is a surface provided on the main body and opposite to the output surface;
    a first diffusing portion which is formed on a part of the reflecting surface closer to the input surface than a preset reference position and diffuses light; and
    a second diffusing portion which is formed on a part of the reflecting surface closer to a side opposite to the input surface than the reference position and diffuses light;
    wherein:
    the first diffusing portion has a first length in a direction orthogonal to the longitudinal direction, the first diffusing portion includes a plurality of recesses disposed at intervals along the longitudinal direction, each recess in the first diffusing portion extending in a direction perpendicular to the longitudinal direction and functioning as a prism;

the second diffusing portion has a second length in the direction orthogonal to the longitudinal direction, the second diffusing portion includes a plurality of recesses disposed at intervals along the longitudinal direction, each recess in the second diffusing portion extending in the direction perpendicular to the longitudinal direction and having a shorter length in the direction perpendicular to the longitudinal direction than the recesses in the first diffusing portion;

each of the plurality of recesses has a first prism surface on the input surface side and a second prism surface on a side opposite to the input surface;

an angle formed by the second prism surface of each recess included in the second diffusing portion and the longitudinal direction on the side opposite to the input surface is smaller than an angle formed by the second prism surface of each recess in the first diffusing portion and the longitudinal direction on the side opposite to the input surface; and the first length is longer than the second length.

2. A light guide according to claim 1, wherein the first length gradually approaches the second length toward the second diffusing portion at least in a part of the first diffusing portion including an area adjacent to the second diffusing portion.

3. A light guide according to claim 1, wherein the angle formed by the second prism surface of each recess included in the second diffusing portion and the longitudinal direction on the side opposite to the input surface is substantially a right angle.

4. A light guide comprising:
a rod-like main body which is capable of guiding light in a longitudinal direction;
an input surface which is provided on one end of the main body and on which the light is inputted;
an output surface which is provided on the main body, from which the light is emitted in a direction intersecting with the longitudinal direction and which is long in the longitudinal direction;
a reflecting surface which is a surface provided on the main body and opposite to the output surface;
a first diffusing portion which is formed on a part of the reflecting surface closer to the input surface than a preset, reference position and diffuses light; and
a second diffusing portion which is formed on a part of the reflecting surface closer to a side opposite to the input surface than the reference position and diffuses light;
wherein:
the first diffusing portion has a first length in a direction orthogonal to the longitudinal direction, the first diffusing portion includes a plurality of recesses disposed at intervals along the longitudinal direction, each recess in the first diffusing portion extending in a direction perpendicular to the longitudinal direction and functioning as a prism;
the second diffusing portion has a second length in the direction orthogonal to the longitudinal direction, the second diffusing portion includes a plurality of recesses disposed at intervals along the longitudinal direction, each recess in the second diffusing portion extending in the direction perpendicular to the longitudinal direction and having a shorter length in the direction perpendicular to the longitudinal direction than the recesses in the first diffusing portion;

each of the plurality of recesses has a first prism surface formed on the input surface side and a second prism surface formed on a side opposite to the input surface;

an angle formed by the first prism surface of each recess included in the first diffusing portion and the longitudinal direction on the input surface side is smaller than an angle formed by the first prism surface of each recess included in the second diffusing portion and the longitudinal direction on the input surface side; and the first length is longer than the second length.

5. A light guide according to claim 4, wherein the angle formed by the first prism surface of each recess included in the first diffusing portion and the longitudinal direction on the input surface side is substantially a right angle.

6. An image reading apparatus, comprising:
a light guide according to claim 1;
a light source for irradiating light to the input surface;
a reflecting member arranged to face the reflecting surface and configured to reflect light; and
an image reading unit for reading an image of a document to which light from the output surface is irradiated.

7. An image forming apparatus, comprising:
an image reading apparatus according to claim 6; and
an image forming unit for forming an image on a sheet based on an image read by the image reading apparatus.

8. A light guide, comprising:
a rod-like main body which is capable of guiding light in a longitudinal direction;
an input surface which is provided on one end of the main body and on which the light is inputted;
an output surface which is provided on the main body, from which the light is emitted in a direction intersecting with the longitudinal direction and which is long in the longitudinal direction;
a reflecting surface which is a surface provided on the main body and opposite to the output surface;
a first diffusing portion which is formed on a part of the reflecting surface closer to the input surface than a preset reference position and diffuses light; and
a second diffusing portion which is formed on a part of the reflecting surface closer to a side opposite to the input surface than the reference position and diffuses light;
wherein:
the preset reference position is at a location along the longitudinal direction in which the illuminance of reflected light that is reflected twice or more in the light guide exceeds the illuminance of reflected light that is reflected once or less in the light guide as a distance from the input surface increases when the diffusing portions have constant lengths in a direction orthogonal to the longitudinal direction for all diffusing portions along the longitudinal direction;
the first diffusing portion has a first length in a direction orthogonal to the longitudinal direction;
the second diffusing portion has a second length in the direction orthogonal to the longitudinal direction; and
the first length is longer than the second length.

9. A light guide according to claim 8, wherein the first length gradually approaches the second length toward the second diffusing portion at least in a part of the first diffusing portion including an area adjacent to the second diffusing portion.

10. A light guide according to claim 8, wherein:
the first diffusing portion includes a plurality of recesses disposed at intervals along the longitudinal direction, extending in a direction perpendicular to the longitudinal direction and functioning as prisms; and
the second diffusing portion includes a plurality of recesses disposed at intervals along the longitudinal direction, extending in the direction perpendicular to the longitudinal direction and having a shorter length in the direction perpendicular to the longitudinal direction than the recesses in the first diffusing portion.

11. A light guide according to claim 10, wherein:
each of the plurality of recesses has a first prism surface on the input surface side and a second prism surface on a side opposite to the input surface;
an angle formed by the second prism surface of each recess included in the second diffusing portion and the longitudinal direction on the side opposite to the input surface is smaller than an angle formed by the second prism surface of each recess in the first diffusing portion and the longitudinal direction on the side opposite to the input surface.

12. A light guide according to claim 11, wherein the angle formed by the second prism surface of each recess included in the second diffusing portion and the longitudinal direction on the side opposite to the input surface is substantially a right angle.

13. A light guide according to claim 10, wherein:
each of the plurality of recesses has a first prism surface formed on the input surface side and a second prism surface formed on a side opposite to the input surface; and
an angle formed by the first prism surface of each recess included in the first diffusing portion and the longitudinal direction on the input surface side is smaller than an angle formed by the first prism surface of each recess included in the second diffusing portion and the longitudinal direction on the input surface side.

14. A light guide according to claim 13, wherein the angle formed by the first prism surface of each recess included in the first diffusing portion and the longitudinal direction on the input surface side is substantially a right angle.

15. An image reading apparatus, comprising:
a light guide according to claim 8;
a light source for irradiating light to the input surface;
a reflecting member arranged to face the reflecting surface and configured to reflect light; and
an image reading unit for reading an image of a document to which light from the output surface is irradiated.

16. An image forming apparatus, comprising:
an image reading apparatus according to claim 15; and
an image forming unit for forming an image on a sheet based on an image read by the image reading apparatus.

* * * * *